United States Patent [19]

Ikeda et al.

[11] Patent Number: 4,495,818
[45] Date of Patent: Jan. 29, 1985

[54] CYLINDRICAL VIBRATOR TYPE PRESSURE TRANSDUCER

[75] Inventors: Kyoichi Ikeda; Kinji Harada; Katsumi Isozaki, all of Tokyo, Japan

[73] Assignee: Yokogawa Hokushin Electric Corporation, Tokyo, Japan

[21] Appl. No.: 454,874

[22] Filed: Dec. 30, 1982

[30] Foreign Application Priority Data

Feb. 12, 1982 [JP] Japan .................. 57-20776

[51] Int. Cl.$^3$ .............................................. G01N 9/00
[52] U.S. Cl. ..................................... 73/702; 73/32 A
[58] Field of Search ................ 73/702, 32 A, 579; 374/117, 118

[56] References Cited

U.S. PATENT DOCUMENTS

| | | | | |
|---|---|---|---|---|
| 3,021,711 | 2/1962 | Arvidson | ................ | 73/702 |
| 3,863,505 | 2/1975 | Moffatt | ................ | 73/702 |
| 4,102,209 | 7/1978 | Brahm | ................ | 73/702 |
| 4,178,804 | 12/1979 | Potter | ................ | 73/702 |
| 4,297,872 | 11/1981 | Ikeda | ................ | 73/702 X |

Primary Examiner—Stephen A. Kreitman
Assistant Examiner—Vincent P. Kovalick
Attorney, Agent, or Firm—Moonray Kojima

[57] ABSTRACT

A pressure gauge for determining the pressure applied to a cylindrical vibrator by measuring the resonance frequency of the vibrator. The vibrator comprises a thin-wall cylindrical portion, a thick wall cylindrical portion extending from one end of the thin wall cylindrical portion and a thick wall end portion joined to the end of the thin wall cylindrical portion. The thin wall cylindrical portion is installed within a cover, to which the thick wall end portion is securely attached. The inventive vibrator type pressure gauge produces greater accuracy and reliability while also being resistant to external vibrations and pressures.

9 Claims, 11 Drawing Figures

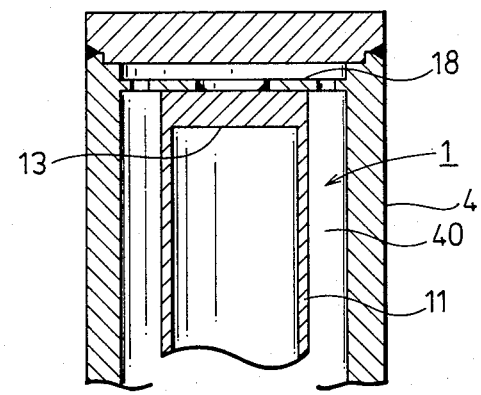
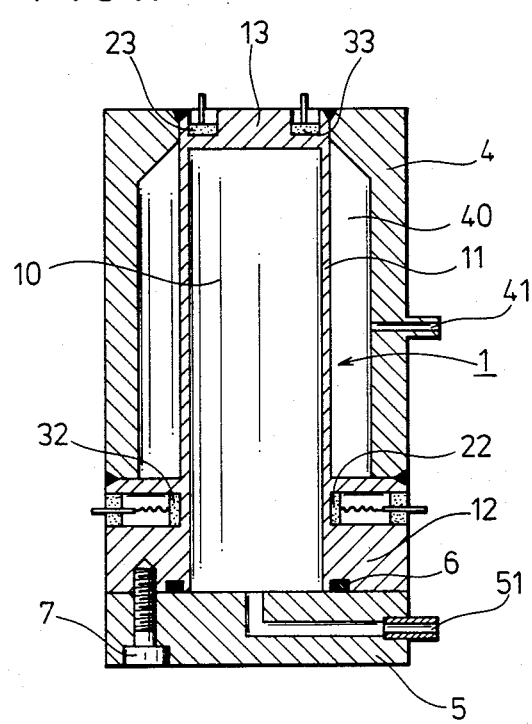

CYLINDRICAL VIBRATOR TYPE PRESSURE TRANSDUCER

BACKGROUND OF THE INVENTION

1. Field of Invention

This invention relates to pressure gauges using a cylindrical vibrator wherein fluid pressure or differential pressure applied to the vibrator affects the resonance frequency of the vibrator. More particularly, this invention relates to such a pressure gauge which is resistant to external pressures and vibrations and which is highly accurate and reliable, and which may be used extensively, for example, and especially effectively, in aircraft applications.

2. Description of the Prior Art

FIG. 1 is a partially broken perspective view of a conventional, cylindrical vibrator type pressure gauge of the type to which this invention is applicable. This pressure gauge comprises a cylindrical vibrator 10, a cylindrical body 11 disposed within vibrator 10 and a driving coil 21 for driving vibrator 10 and a detector coil 31 for detecting vibrations of the vibrator 10. The coils 21 and 31 are installed on the body 11 as depicted. Vibrator 10 is housed in a cylindrical protective cover 4. Pressure $P_i$ (e.g. pressure of a fluid or gas), undergoing measurement is admitted into the inside of vibrator 10 through an inlet hole 51. Vibrator 10 is so constructed that its resonance frequency varies in accordance with the difference between pressure $P_i$ and the pressure within the chamber between vibrator 10 and cover 4, that is the pressure outside of vibrator 10, which may be the reference pressure.

The conventional device of FIG. 1 has cylindrical body 11 holding coil 21, which acts to vibrate vibrator 10 and holding coil 31 for detecting the resonance frequency. One end of body 11 is a free end. Consequently, body 11 can have natural frequencies in a direction perpendicular to the axial direction. Thus, the resonance frequency of vibrator 11 is undesirably affected thereby. Furthermore, in order to increase resistance to pressure, the side wall and the end portion of vibrator 10 are required to be thick, which lowers the natural frequencies of the vibrator in a direction perpendicular to the axial direction of the vibrator. The result is that the conventional device is more susceptible to external vibrational noise.

SUMMARY OF THE INVENTION

Accordingly, an object of the invention is to overcome the aforementioned and other deficiencies and disadvantages of the prior art.

Another object is to provide a cylindrical vibrator type pressure gauge which assures accurate and reliable measurement and is resistant to external pressures and vibrations, and is free also from the aforementioned deficiencies and disadvantages.

The foregoing and other objects are attained in this invention which encompasses a cylindrical vibrator used in a pressure gauge, comprising a thin wall cylindrical portion, a thick wall cylindrical portion extending from one end of the thin wall cylindrical portion, and a thick wall end portion connected to the other end of the thin wall cylindrical portion. The vibrator is disposed within a cover, and the thick wall end portion is securely attached to the cover.

A feature of the invention is a pressure gauge wherein the vibrator comprises a thin wall cylindrical portion, a thick wall cylindrical portion extending from one end of the thin wall cylindrical portion, and a thick wall end portion connected to the other end of the thin wall cylindrical portion, a cover surrounds the cylindrical portions and is connected to the thick wall end portion and further comprising driving means and detector means.

Another feature is the location of the driving means and detector means perpendicular to each other and in substantially the same plane disposed vertical to the axis of the vibrator.

A further feature is the use of a flexible absorbing means connected to the thick wall end portion and to the cover, whereby thermal forces are absorbed thereby.

Another feature is the further use of driving means and detector means in the thick wall end portion, for the axial driving and detection of axial vibrations.

BRIEF DESCRIPTION OF THE DRAWING

FIGS. 6 and 7 are fragmentary cross sectional views of other illustrative embodiments of the invention.

DETAILED DESCRIPTION OF PREFERRED EMBODIMENTS

Figure 2:
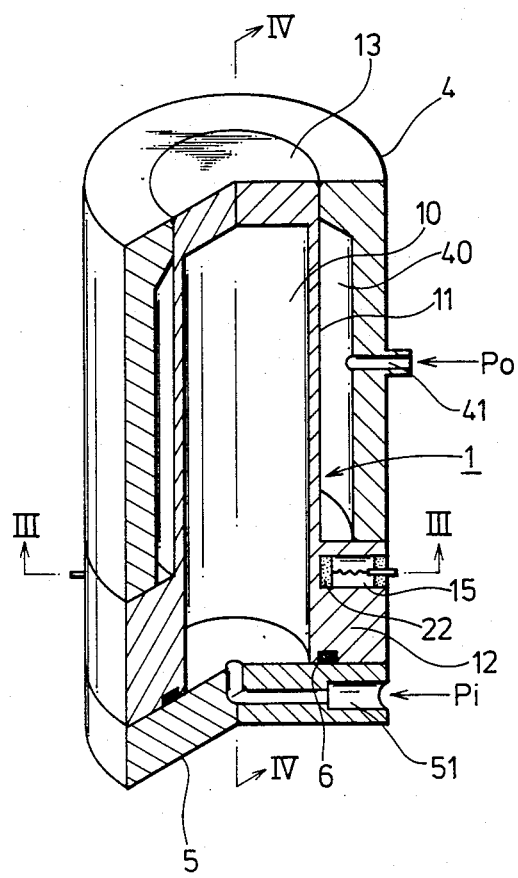
FIG. 2 is a perspective view (partially broken) of an illustrative embodiment of the invention.
Figure 3:
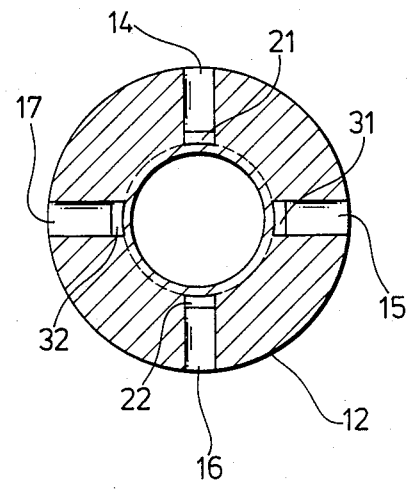
FIG. 3 is a cross sectional view taken along line III—III in FIG. 2.
Figure 4:
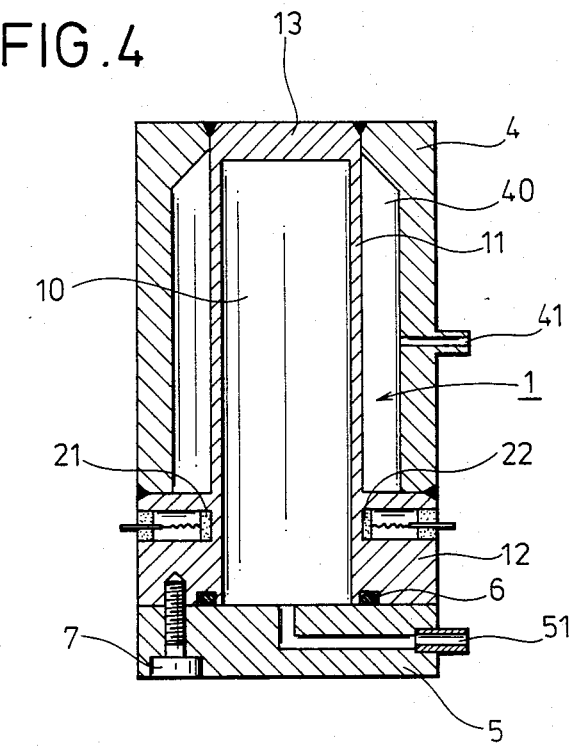
FIG. 4 is a cross sectional view taken along line IV—IV in FIG. 2.

FIG. 2 depicts the construction of one illustrative embodiment of a pressure gauge according to the invention. FIG. 3 is a cross sectional view taken along line III—III in FIG. 2. FIG. 4 is a cross sectional view taken along line IV—IV in FIG. 2. In these figures, a cylindrical vibrator 1 comprises a thin wall cylindrical portion 11, a thick wall cylindrical portion 12, extending from one end of the thin wall cylindrical portion 11, and a thick wall end portion 13, closing the opening at the opposite end of thin wall cylindrical portion 11. Thick wall cylindrical portion 12 is provided with four holes 14–17 (see FIG. 3) spaced apart 90° from one another along the periphery of the vibrator and generally in the same plane positioned vertical to the axis of the vibrator. The holes 14–17 extend from the outer periphery to the vicinity of the inner wall and are, for example, machined by spot facing. Of these holes, the diametrically opposed holes 14 and 16 house driver means 21 and 22, respectively. The driver means are used to excite of vibrate vibrator 1. The other diametrically opposed holes 15 and 17, house detector means 31 and 32, respectively. The detector means are used to detect resonance frequency of vibrator 1 when vibrated by the driver means. Piezo-electric devices are used for driver means 21 and 22, and for detector means 31 and 32. Vibrator 1 is housed within a cover 4, one end of which is securely attached to the thick wall cylindrical portion 12. Thick wall end portion 13 of vibrator 1, which is inserted in an opening of cover 4, and which is securely attached to cover 4, has an outer diameter substantially equal to the inner diameter of cylindrical portion 12. The attaching of cover 4 to thick wall cylindrical portion 12 and to the one end of vibrator 1, and to thick wall end portion 13, is effected by, for example, welding, so that air tightness is maintained. Cover 4 is provided with a pressure inlet port 41 through its side wall, and pressure (e.g. fluid or gas to be measured for pressure) is admitted into a chamber 40 formed between vibrator 1 and cover 4 through inlet port 41. A disc like body 5 is attached to the bottom end of vibrator 1 with a screw 7 (see FIG. 4) with an O-ring seal means 6 interposed therebetween. Another pressure inlet port 51 extends from the surface of side wall of body 5 to the interior 10 of vibrator 1 so as to admit pressure into the interior.

Figure 5:
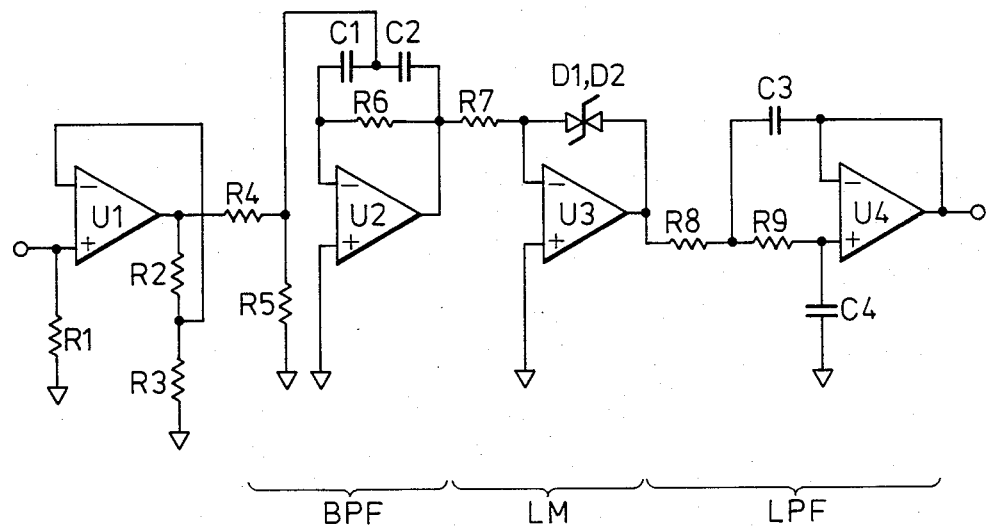
FIG. 5 is a connection diagram of an electrical circuit used in connection with the illustrative embodiment.

Referring to FIG. 5, there is depicted a diagram of an electric circuit for vibrating vibrator 1 at its resonance frequency. Driver means 21 and 22, and detector means 31 and 32 of vibrator 1 are connected to this circuit in a manner to be described. The circuit comprises an amplifier $U_1$ for amplifying signals from detector means 31 and 32 connected, for example, to the terminal connected to the + input terminal of amplifier $U_1$, a band pass filter (abbreviated as BPF) which includes an amplifier $U_2$, a limiter (abbreviated as LM) which comprises an amplifier $U_3$ and a low pass filter (abbreviated LPF) which includes an amplifier $U_4$ and rotates the phase of the output signal from the limiter to satisfy the condition for self oscillation. The output signal from the low pass filter is applied via, for example, terminal connected to the output terminal of amplifier $U_4$ to driver means 21 and 22. Thus, the circuit forms a self oscillation loop including driver means 21,22, cylindrical vibrator 1, and detector means 31,32; and causes the vibrator 1 to vibrate in a circumferential mode, for example, in the fourth order mode.

The novel embodiment is characterized by the use of the thick wall endportion 13, connected to the thin wall cylindrical portion 11, which is also connected to the cover 4, and which is thick in dimension.

In the operation of the illustrative embodiment of FIG. 2, pressure $P_o$ (the reference pressure) is admitted into chamber 40 through inlet port 41 and, at the same time, pressure $P_1$ (the pressure to be measured) is admitted into the interior 10 of vibrator 1 through inlet port 51. It should be noted that in this discussion, when measurements of pressure are made, it is the fluid or gas which is being measured for pressure, and the description is to be so understood, such as when for example reference is made to pressure being admitted to interior 10, it is the fluid or gas that is admitted, and the pressure thereof is measured. Since vibrator 1 forms a self oscillation loop in cooperation with the electrical circuit depicted in FIG. 5, its vibration frequency f is given by $$f/f_o = \sqrt{1 + \alpha(P_i - P_o)} \quad (1)$$

wherein $\alpha$ is a constant, $P_o$ is the pressure within chamber 40, $P_i$ is the pressure within interior 10, and $f_o$ is the vibration frequency of vibrator 1 under the condition $P_i = P_o$.

Consequently, if $f_o$ and $\alpha$ are determined in advance, the pressure $(P_i - P_o)$ can be found from the vibration frequency f. Furthermore, if chamber 40 surrounding vibrator 1 is evacuated, then the pressure $P_i - P_o$ will be an absolute pressure.

In view of the fact that the change in resonance frequency f of vibrator 1 depends mostly on the circumferential tension or compressive force acting on the cylindrical surface, the thick wall end portion 13 is fixed to cover 4. As a result, the end portion 13 can be made thick and that the natural frequencies in a direction perpendicular to the axis of the device can be made higher.

The novel illustrative embodiment has improved resistance to external vibration and pressure. Furthermore, since vibrator 1 has a cavity, vibration affecting the resonance frequency of vibrator 1 is not generated, and it is unaffected by external vibrational noise. Furthermore, as vibrator 1 exerts a force in the vicinity of a node of vibration within thick wall cylindrical portion 12, that is, for driving thin wall cylindrical portion 11, the device yields a higher Q and can perform measurement of pressure with greater accuracy.

Referring to FIG. 6, there is depicted the principal portions of another illustrative embodiment of the invention. In this embodiment, cylindrical vibrator 1 is housed within cover 4 and thick wall end portion 13 of vibrator 1 is secured to cover 4 via a flexible member 18, which is flexible in the axial direction of vibrator 1 and acts to absorb the difference between the thermal expansion of the end portion and that of the cover. Member 18 is also held so that it does not move in the circumferential direction.

In this embodiment, the outside of end portion 13 of vibrator 1 and the outside of the side wall of the vibrator 1 can have a pressure kept equal to the pressure within cover 4. Thus, the embodiment will be unaffected by variations in pressure of the outside air.

Referring next to FIG. 7 there is depicted a further illustrative embodiment of the invention, in cross section. This embodiment is similar to that shown in FIG. 2, except that a drier means 23, for vibrating thin wall cylindrical portion 11 in its axial direction, and a detecting means 33, for detecting vibrations of the vibrator 1 in such axial direction, are installed near the periphery of the end portion 13, as depicted.

In the embodiment of FIG. 2, the driver means 21 and 22 cause thin wall cylindrical portion 11 to vibrate in the circumferential direction at a given mode. In the embodiment of FIG. 7, in addition to the circumferential vibration, the driver means 23 causes axial vibration of the thin wall cylindrical portion 11 at another give mode, and the resonance frequency of the axial vibration is detected by detector means 33. It is to be noted that driver means 23 is not necessarily required, because some axial vibration may also be produced by the circumferential vibrations.

In the embodiment of FIG. 7, the single thin wall cylindrical portion 11 vibrates in two given modes. Consequently, after the resonance frequencies $f_1$ and $f_2$ are obtained, if predetermined arithmetic operations are performed using these values, then a pressure signal which is unaffected by the temperature of the environment surrounding the vibrator 1, the density of the pressure fluid undergoing measurement, etc, can be obtained.

In the above embodiment, the thick wall cylindrical portion 12 is formed with holes machined by, for example, spot facing, and driver means (e.g. 23,21,22) and detector means (e.g. 33,31,32) are installed in holes so formed. Such holes, however, may be replaced with grooves or the like. Also, the driver means can differ in number from the detector means. If more driver means and detector means are employed, then a more complicated higher order circumferential vibrational mode can be produced. Furthermore, the driver means and detector means may be installed at locations other than the thick wall cylindrical wall portion 12. Also, these driver means and detector means may be electromagnetic devices or other types of known devices for performing the same functions, instead of the piezo-electric above described. Furthermore, instead of the above construction, in which vibrator 1 has an end portion 13 which is closed, the end portion 13 may also be provided with a through hole in order to introduce the same pressure into the inside of cover 4 and into the interior of vibrator 1.

Figure 1:
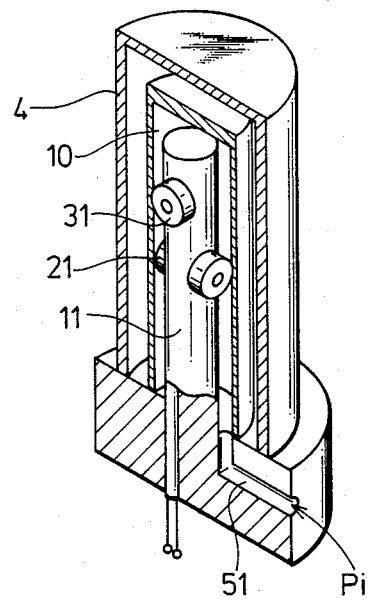
FIG. 1 is a partial broken perspective view of a conventional vibrator type pressure gauge.
Figure 8:
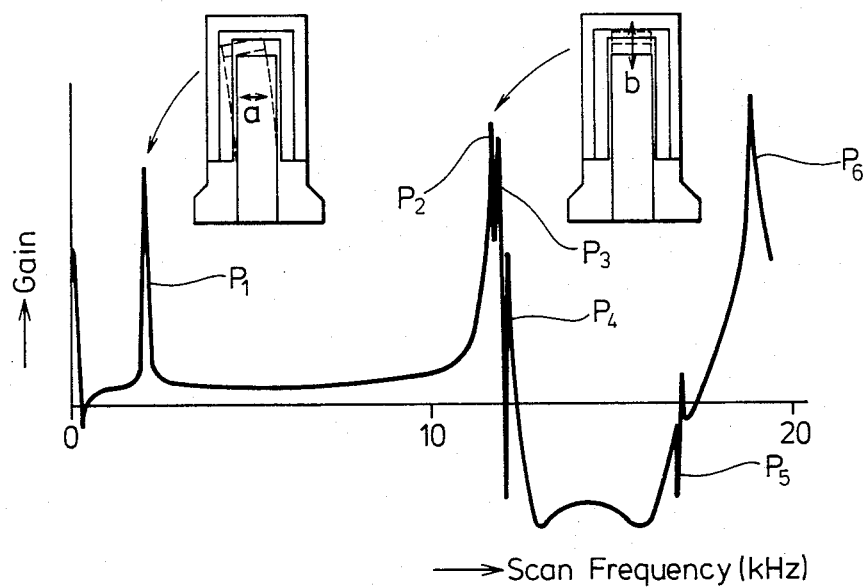
FIGS. 8 and 9 are characteristic curves of cylindrical vinbrators having different constructions, depicting the relationship between sweep frequency and gain.
Figure 9:
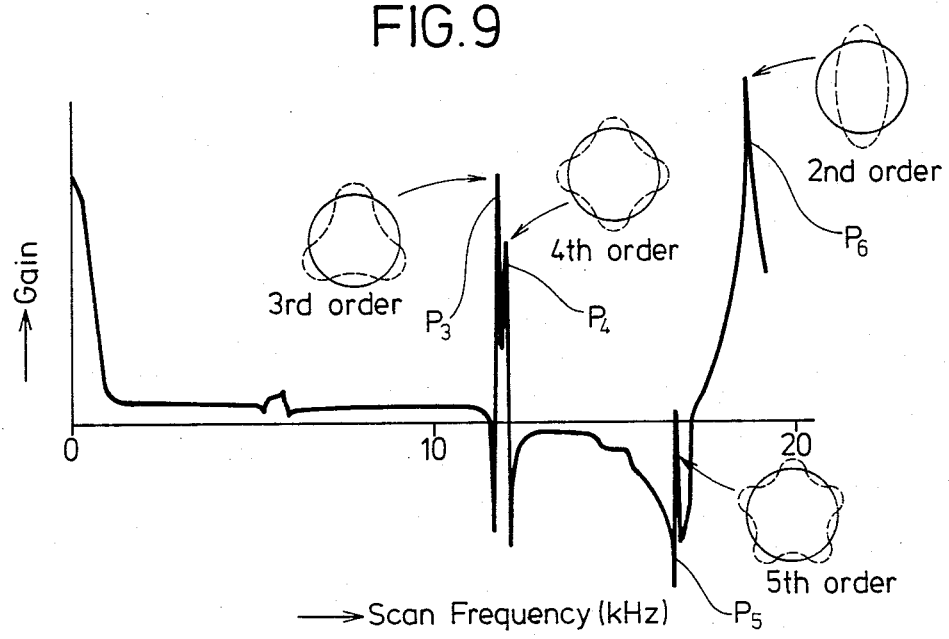

FIG. 8 depicts a characteristic curve of the conventional cylindrical vibrator of FIG. 1, and shows the relationship between sweep frequency and gain, while FIG. 9 depicts a similar curve for the illustrative embodiment of FIGS. 2-4. These are the results of experiments. The curve of FIG. 8 has a peak $P_1$ caused by the vibration in the direction indicated by arrow a, and peak $P_2$ caused by the vibration in the direction indicated by arrow b. In contrast to this set of curves, it was discovered that the curve of FIG. 9, which was derived from data obtained using the illustrative embodiments of FIGS. 2-4, contained no such peaks.

Figure 10:
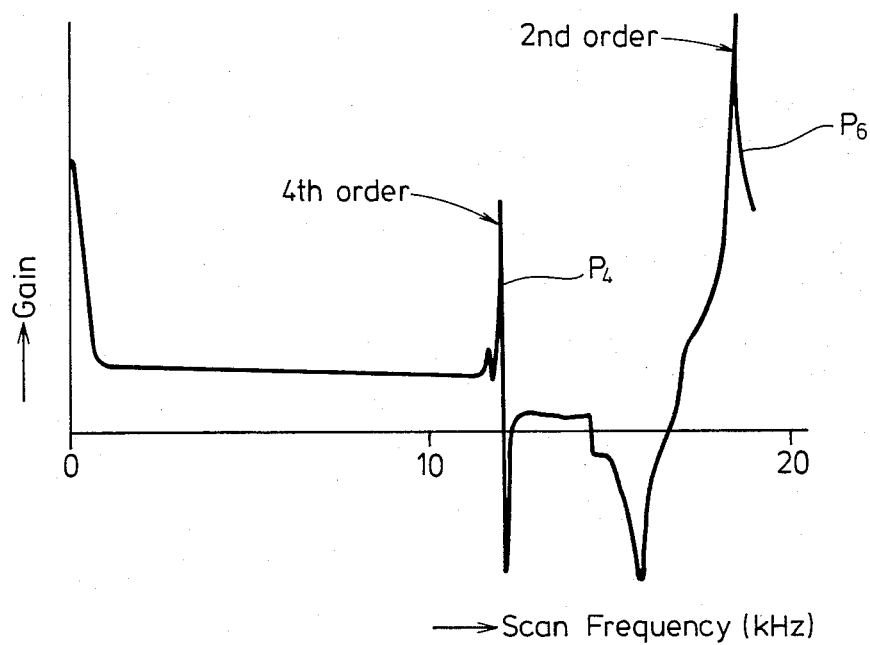
FIG. 10 is a characteristic curve of the connection configuration of FIG. 11 depicting the relation between sweep frequency and gain.
Figure 11:
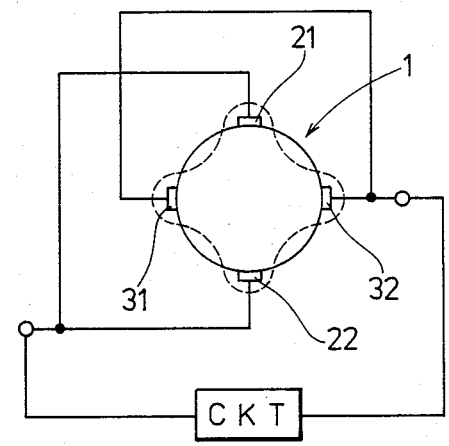
FIG. 11 is a circuit diagram used in connection with the illustrative embodiment of the invention.

FIG. 10 is a curve showing the relation between sweep frequency and gain under conditions wherein driver means 21 and 22 and detector means 31 and 32, were installed respectively at opposed positions, as depicted in FIG. 11 (such as depicted in FIG. 3), to form a self oscillation loop and that cylindrical vibrator 1 is caused to vibrate in the fourth order mode. The circuit connection configuration, as shown in FIG. 11, can eliminate peaks $P_3$ and $P_5$ depicted in FIG. 9, and allows vibrator 1 to vibrate stably in the fourth order mode as indicated in FIG. 11 by the broken lines.

As described hereinbefore, in accordance with the present invention, a cylindrical vibrator type pressure gauge is obtained which can perform measurements accurately and reliably, and is resistant to external pressures and vibrations.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A pressure gauge comprising
a cylindrical vibrator;
a cover for said vibrator;
means for supplying a reference pressure to said gauge;
means for supplying pressure to be measured to said gauge;
driving means for driving said vibrator; and
detector means for detecting the vibration of said vibration caused by said driving means; and wherein
said cylindrical vibrator consists essentially of a thin wall cylindrical portion, a first thick wall cylindrical portion extending from one end of said thin wall cylindrical portion, and a second thick wall end portion closing an opening at the opposite end of said thin wall cylindrical portion; and wherein
at least said thin wall cylindrical portion is installed within said cover; and wherein
said second thick wall end portion is securely attached to said cover.

2. A pressure gauge comprising
a cylindrical vibrator;
a cover for said vibrator;
means for supplying a reference pressure to said gauge;
means for supplying a pressure to be measured to said gauge;
driving means for driving said vibrator; and
detector means for detecting the vibration of said vibrator caused by said driving means; and wherein
said cylindrical vibrator consists essentially of a thin wall cylindrical portion, a thick wall cylindrical portion extending from one end of said thin wall cylindrical portion, and a thick wall end portion joined to the other end of said thin wall cylindrical portion; and wherein
at least said thin wall cylindrical portion is installed within said cover; and wherein
said thick wall end portion is securely attached to said cover, wherein said driving means and said detecting means are installed in said thick wall cylindrical portion.

3. A pressure gauge comprising
a cylindrical vibrator;
a cover for said vibrator;
means for supplying a reference pressure to said gauge;
means for supplying a pressure to be measured to said gauge;
driving means for driving said vibrator; and
detector means for detecting the vibration of said vibrator caused by said driving means; and wherein
said cylindrical vibrator consists essentially of a thin wall cylindrical portion, a thick wall cylindrical portion extending from one end of said thin wall cylindrical portion, and a thick wall end portion joined to the other end of said thin wall cylindrical portion; and wherein
at least said thin wall cylindrical portion is installed within said cover; and wherein
said thick wall end portion is securely attached to said cover, wherein said cover is provided with a member having flexibility in the axial direction of said vibrator, and wherein said thick wall end portion is affixed to said member.

4. The gauge of claim 2, wherein said detector means and said driving means are also installed near the periphery of said thick wall end portion, for producing and detecting vibrations in the axial direction of said vibrator.

5. A cylindrical vibrator type pressure gauge comprising
a cylindrical vibrator consisting essentially of a thin wall cylindrical portion, a thick wall cylindrical portion extending from one end of said thin wall cylindrical portion and a thick wall end portion joined to the other end of said thin wall cylindrical portion;
a cover for enclosing at least said thin wall cylindrical portion of said vibrator, said thick wall end portion being attached to said cover;

driver means for driving said vibrator, said driving means being installed in opposition to each other near an internal wall of said thick wall cylindrical portion;

detector means for detecting vibration caused by said driver means of said vibrator, said detector means being installed in opposition to each other near an internal wall of said thick wall cylindrical portion; and an electrical circuit for receiving signals from said detector means and for applying signals to said driver means, said electrical circuit including said driver means, said cylindrical vibrator and said detector means, forming thereby a self oscillation loop.

6. The gauge of claim 5, wherein said detector means and said driver means are disposed on the same plane perpendicular to the axis of said vibrator.

7. The gauge of claim 5, wherein said vibrator vibrates circumferentially in the fourth order mode.

8. The gauge of claim 5, wherein said electrical circuit includes a band pass filter, a limiter, and a low pass filter.

9. The gauge of claim 6, wherein said detector means further comprises detector means positioned in said thick wall end portion at its periphery, and wherein said driver means further comprises driver means positioned in said thick wall end portion at its periphery, whereby axial vibrations are caused by said driver means and detected by said detector means.

* * * * *